US005861846A

United States Patent [19]
Minter

[11] Patent Number: 5,861,846
[45] Date of Patent: Jan. 19, 1999

[54] AVIATION PILOT COLLISION ALERT

[76] Inventor: Jerry B Minter, 48 Normandy Heights Rd., Convent Station, N.J. 07961

[21] Appl. No.: 602,067

[22] Filed: Feb. 15, 1996

[51] Int. Cl.$^6$ .............................. G01S 5/04; G01S 15/00; G08G 5/04
[52] U.S. Cl. .......................... 342/443; 340/961; 367/116
[58] Field of Search ........................... 342/443; 340/961, 340/952; 364/424.06; 348/116, 117; 367/116

[56] References Cited

U.S. PATENT DOCUMENTS

| | | | |
|---|---|---|---|
| 4,188,504 | 2/1980 | Kasuga et al. | 179/1 GP |
| 4,528,563 | 7/1985 | Takeuchi | 340/903 |
| 4,817,149 | 3/1989 | Myers | 381/1 |
| 4,967,641 | 11/1990 | Chambre | 89/41.08 |
| 5,424,556 | 6/1995 | Symosek et al. | 250/561 |
| 5,495,427 | 2/1996 | Puma et al. | 364/516 |
| 5,647,016 | 7/1997 | Takeyama | 340/961 |

*Primary Examiner*—Gregory C. Issing
*Attorney, Agent, or Firm*—Morrison Law Firm

[57] ABSTRACT

A collision alert system employs binaural acoustic effects to direct the attention of a person in a desired direction. In one embodiment, the angular location of a possible collision risk is detected to energize one of a plurality of acoustic generators spaced angularly apart about the cockpit of an aircraft. The Pilot utilizes normal delay and acoustic modification of high frequencies to determine the direction to look for the target. In another embodiment, the pilot wears headphones which inhibit normal binaural direction location. The delay and acoustic modification are simulated before being fed to left and right headphones. In a wired system, the headphone signals are produced off the headphones. The head angular position of the pilot is compensated so that, as the pilot's head is turned toward the simulated target position, the delay and acoustic modification are adjusted to compensate for the actual head position. In a further embodiment, the target angle is communicated to the headphone-wearing pilot using an optical radiation emitter. A plurality of receiving devices on the headphone determines the angular location of the pilot's head relative to the target angle. In a further embodiment, an optical radiation emitter is modulated to indicate the target location.

6 Claims, 5 Drawing Sheets

AVIATION PILOT COLLISION ALERT

BACKGROUND OF THE INVENTION

The present invention relates to aircraft anti-collision warning devices and, more particularly, to devices for directing the full attention of an aircraft operator in a direction in which the presence of a potential collision threat is detected.

In the early days of aviation, aircraft were scarce, and the sky was thought to be very large. Collision avoidance was not considered to be a serious problem. Over time, many more aircraft have joined the commercial and general aviation fleets. Now, close approaches between aircraft are quite common. A mid-air collision between a commercial jet and a single-engine aircraft, and their subsequent 100-percent fatal crash, near San Diego, increased the interest in finding ways to avoid mid-air collisions.

The Federal Aviation Administration imposes flight restrictions around all of the high-traffic airports in the country to deny such airspace to most of the general aviation fleet, with the thought that this would avoid close encounters between general aviation and commercial aircraft. In such restricted airspace, all aircraft are in communication with, and under the control of, an air traffic controller, who has both primary radar (conventional radar which depends on radio waves reflected from the target to the radar) and secondary search radar (SSR) available to inform the controller of the position and altitude of all controlled aircraft. SSR employs an aircraft-mounted transponder to produce a radio signal in response to an interrogation signal transmitted by the ground radar. It is generally accepted that such restrictions were in place, and that both aircraft were directed by the FAA, during the San Diego incident noted above, but that the measures in place did not prevent the occurrence of a collision between the two aircraft.

Primary radar is a system in which radar energy is directed in a vertically broad and horizontally narrow beam by a rotating antenna. Radar energy, reflected from an aircraft target, is detected at the radar site. The azimuth angle of the target with respect to the radar antenna is determined by the direction in which the antenna is pointing when a reflection is received. The distance to the target is determined by the round-trip transit time of the radar energy from the antenna, to the target, and back to the antenna. Thus, a primary radar determines the X and Y positions of a target, but is incapable of determining target altitude (Z). Besides the unavailability of altitude information, primary radar suffers from variations in reflectivity of a particular target with changing aspect, and differences in target reflectivity between different targets. These differences create substantial differences in the brightness of the image (blip) painted on a radar screen.

The problems with primary radar was the principal genesis of the Air Traffic Control Radar Beacon System (ATCRBS), generally pronounced "at crabs". The ATCRBS system consists of a secondary search radar (SSR) antenna co-located with the primary radar antenna, and a beacon transponder in each aircraft. The SSR interrogation antenna, producing a vertically broad and horizontally narrow beam of energy at 1030 MHZ, rotates with the primary radar antenna. Beacon transponders in aircraft, when they receive the 1030 MHZ interrogation signal, produce a pulse-coded output signal at 1090 MHZ that contains either identity or altitude information. The identity information is dialed in from the front panel of the transponder, while the altitude information is derived on-board from an encoding altimeter. When an aircraft is operating under "positive control", that is, under control of a ground controller, the identity information dialed into the transponder is a four-digit code supplied by the ground controller. Thus, when the ground controller receives a coded identity code, this code serves to identify the aircraft.

A transponder transmits identity information (Mode A) in response to an identity interrogation signal, and altitude information (Mode C) in response to an altitude interrogation signal. An identity interrogation signal consists of a pair of 0.8 microsecond pulses spaced 8 microseconds apart. An altitude interrogation signal consists of a pair of 0.8 microsecond pulses spaced 21 microseconds apart. An SSR interrogation cycle includes two Mode A interrogations and one Mode C interrogation. One receiving the transponder coded signal, without further information, would not know whether the signal represents identity or altitude. The SSR sorts out Mode A from Mode C responses according to the nature of the just-transmitted interrogation signal. That is, if the SSR has just transmitted a Mode A interrogation signal, the SSR accepts a received coded signal as an identity signal. Alternatively, if the SSR has just transmitted a Mode C interrogation signal, the SSR accepts a received coded signal as an altitude signal.

The SSR signal, since it contains identity and altitude information, as well as azimuth and range, derived from antenna azimuth and transit time, has proven quite useful in air traffic control. A controller's radar scope, instead of displaying unidentified radar blips, is computer controlled to display selectively identity and altitude information of aircraft. The controller can choose to display only those aircraft in a particular altitude band (e.g. all aircraft between 5,000 and 12,000 feet) or only those in a particular area (e.g. the area of the controller's responsibility).

Even though all aircraft in a terminal area (generally known as Class B airspace) may be displayed on the controller's radar scope, experience has shown that the air traffic control system is ill prepared to assist pilots in collision avoidance. In many cases, controllers are understaffed for the present air traffic loads, particularly in large metropolitan areas. They are so hard pressed to adequately serve commercial traffic that they are, at times, unable to provide adequate protection of private, or general aviation, aircraft.

Attempts are under way to monitor courses leading to collisions using computer algorithms, and to issue warnings and/or instructions automatically based on the outcome of the algorithms. Such algorithms have proven imperfect and, in extreme cases, have directed pilots in directions leading to greater danger, rather than less. In addition, even when a controller issues a traffic alert, such an alert generally consists of a distance, a clock direction and a transponder-derived altitude (e.g. target at 5000 feet, four miles at nine o'clock). It is a common experience that pilots who receive such information fail to see the other aircraft, even though they are told the distance and relative direction of the target.

In the end, it is the responsibility of the pilot to avoid collision with other aircraft. This is true whether the aircraft is operated under Visual Flight Rules (VFR) or Instrument Flight Rules (IFR). Attempts have been made to develop on-board equipment to assist the pilot in detecting the presence of other aircraft in the vicinity of the pilot's aircraft. One such attempt employs passive listening to determine the azimuth direction and received signal strength of beacon transponders of all aircraft in the vicinity. Various display schemes are possible. In one display scheme, all received signals are displayed with their directions related to the center-line of the pilot's aircraft and their distances related to the received signal strength. This approach, although valuable, suffers from some admitted drawbacks. First, it lacks altitude information. Second, variations in signal strength between aircraft, and variations in signal propagation about an aircraft, make the strength-is-range concept imperfect.

A second approach, disclosed in my U.S. Pat. No. 5,223, 847, the disclosure of which is herein incorporated by reference, stores three successive beacon responses from an aircraft. These responses are compared. Two of these responses are identity information, and one is altitude, since the SSR interrogates twice for identity while interrogating once for altitude. To decode the transmitted altitude signal, the coded signal which appears twice in the three successive responses is discarded, and the third, which must contain the altitude information, is decoded. This altitude is compared with the pilot's aircraft altitude to determine whether or not the two altitudes are close enough to cause concern. In addition to determining the coded altitude transmitted by the other aircraft, the disclosed system includes a technique for determining the direction of the received signal. Combining the direction, and the comparison of altitude permits calculations that determine whether conditions exist that could lead to a collision. When a collision threat exists, a suitable display is energized.

Two problems are identified with the system of the '847 patent. First, encoding altimeter errors in the pilot's aircraft, and/or the target aircraft may indicate safe conditions, when, in fact, unsafe conditions exist, or vice versa. Second, even when the conditions are correctly received, a technique for directing the pilot's attention in the direction of the target (up/down and heading angle) is imperfect.

One approach for solving the altitude-error problem is disclosed in my U.S. patent application, Ser. No. 85,023 now U.S. Pat. No. 5,506,590, in which the content of the beacon transponder signal is ignored, and only the transponder signal itself is used to determine direction, heading angle and elevation angle of the transponder relative to the pilot's aircraft. An antenna array atop the aircraft, similar to the '087 patent, determines the direction and signal strength of a transponder signal. The content of the coded signal, both identification and altitude, are ignored—only the 0.45 microsecond framing pulses, spaced 20.4 microseconds apart, are employed. An omnidirectional antenna at the bottom of the aircraft, together with the top antenna array, determines the vertical angle from which the beacon transponder signal originates. This assumes a reasonable spacing between top and bottom antennas of about 6 feet, which is customary for even small general aviation aircraft.

The system disclosed in the application indicates the direction of the origin of the beacon transponder signal within about 45 degrees (eight segments around 360 degrees). An indicator proposed in the application includes an array of three sets of eight LEDs arranged in a circle. Each set of LEDs contains a mini array of a green LED, a red LED and a yellow LED. If the signal strength indicates that the beacon transponder is within about 5 miles, and if its vertical angle is within about 7 degrees, a green LED is flashed in the selected sector. If the signal strength indicates that the beacon transponder is closer than about 5 miles, and more than about 2 miles, and is within an angular range of about 7 degrees above or below the aircraft, an amber LED flashes in the selected sector. Finally, if the signal strength indicates that the beacon transponder is within about two miles, and within an angular range of about 7 degrees above or below the aircraft, a red LED flashes. The LEDs flash at the rate at which ground interrogation reaches the target aircraft. This rate is about once every four seconds. The color of the flashing LED calls attention to its significance. The angle of 7 degrees is chosen because, at two miles range, this represents about 1000 feet vertical separation, which is considered to be a minimal amount for collision avoidance.

Using the techniques disclosed in my prior patent and application, it is also possible to determine, not only that a target is within an up-down angular range, but also whether the target is up or down with respect to the hull of the pilot's aircraft. This information can be communicated by illuminating a combination of LEDs, or by having two additional LEDs, one illuminated to indicate that the target is up, and the other illuminated to indicate that the target is down. If both are illuminated, the target is at approximately the same altitude, as derived from elevation angle.

A newer anticollision system called TCAS, not yet in widespread use, employs transponders in aircraft which interrogate each other at regular intervals of, for example, about once each second. TCAS transponders operate autonomously, rather than upon interrogation from the ground. The clutter in a busy terminal area from so many transponders asynchronously on the air at the same time makes it difficult to separately process anticollision signals. In addition, some TCAS systems reduce their transmitted signal strength in busy environments to reduce clutter. This interferes with strength-is-range type ranging but, due to the usual reciprocal relationship between signal strength and range, this type of ranging remains useful. A TCAS system can be recognized because, since the TCAS output occurs autonomously once per second, the appropriate LED is flashed at a once-per-second rate for each aircraft within the signal-strength and angle limits of the system, rather than at the rate of once every four seconds for responses to ground interrogation.

Even with the heading, up-down angular band and approximate distance to a target identified, a problem remains in communicating to the pilot the appropriate direction in which to direct the pilot's view. This is the same problem as attempting to locate visually a target identified by air traffic control as being "at 11 o'clock, 6500 feet, and traveling northeast". Indeed, the problem may be worse, since the disclosed LED indicators are generally mounted vertically the aircraft dashboard. It is a well-known difficulty to relate a direction presented in a vertical circle to a direction with respect to the fore-and-aft axis of an aircraft. This difficulty is compounded by the changing geometry of angles and line of sight between moving and maneuvering aircraft.

OBJECTS AND SUMMARY OF THE INVENTION

Accordingly, it is an object of the invention to provide an alerting system which overcomes the drawbacks of the prior art.

It is a further object of the invention to provide an alerting system that informs a pilot of the bearing of a target aircraft in a manner which is related to a direction in which the pilot is looking.

It is a still further object of the invention to provide an alerting system that audibly informs a pilot of the bearing of a target aircraft using a directional audio signal.

Briefly stated, the present invention provides a collision alert system employing binaural acoustic effects to direct the attention of a person in a desired direction. In one embodiment, the angular location of a possible collision risk is detected to energize one of a plurality of acoustic generators spaced angularly apart about the cockpit of an aircraft. The Pilot utilizes normal delay and acoustic modification of high frequencies to determine the direction to look for the target. In another embodiment, the pilot wears headphones which inhibit normal binaural direction location. The delay and acoustic modification are simulated before being fed to left and right headphones. In a wired system, the headphone signals are produced off the headphones. The head angular position of the pilot is compensated so that, as the pilot's head is turned toward the simulated target position, the delay and acoustic modification are adjusted to compensate for the actual head position. In a further embodiment, the target angle is communicated to the headphone-wearing pilot using an optical radiation emitter. A plurality of receiving devices on the headphone determines the angular location of the pilot's head relative to the target angle. In a further embodiment, an optical radiation emitter is modulated to indicate the target location.

According to an embodiment of the invention, there is provided apparatus for guiding a viewing angle of a person comprising: means for determining a first angle to a target with respect to a reference line, means for producing a binaural acoustic signal related to the angle, the acoustic signal including delay and frequency compensation over at least a range of the first angle capable of giving the person audible cues as to a location of the target, and means for compensating the acoustic signal according to a second angle of a head of the person with respect to the reference line so that an apparent angle of the source with respect to the person is straight ahead when the first and second angles are equal.

According to a feature of the invention, there is provided apparatus for guiding a direction of view of a person with respect to a fixed angle comprising: a plurality of acoustic generators angularly spaced about the person, the plurality of acoustic generators being fixed relative to the fixed angle, means for receiving at least one signal representing a first angle of a target with respect to the fixed angle, and means for energizing a one of the plurality of acoustic generators disposed at a second angle most closely aligned with the first angle, whereby the person receives audible clues as to the first angle.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a top view of an aircraft to which reference will be made in describing the physical situation and the location of acoustic generators according to one embodiment of the invention.

DETAILED DESCRIPTION OF THE PREFERRED EMBODIMENT

Figure 1:
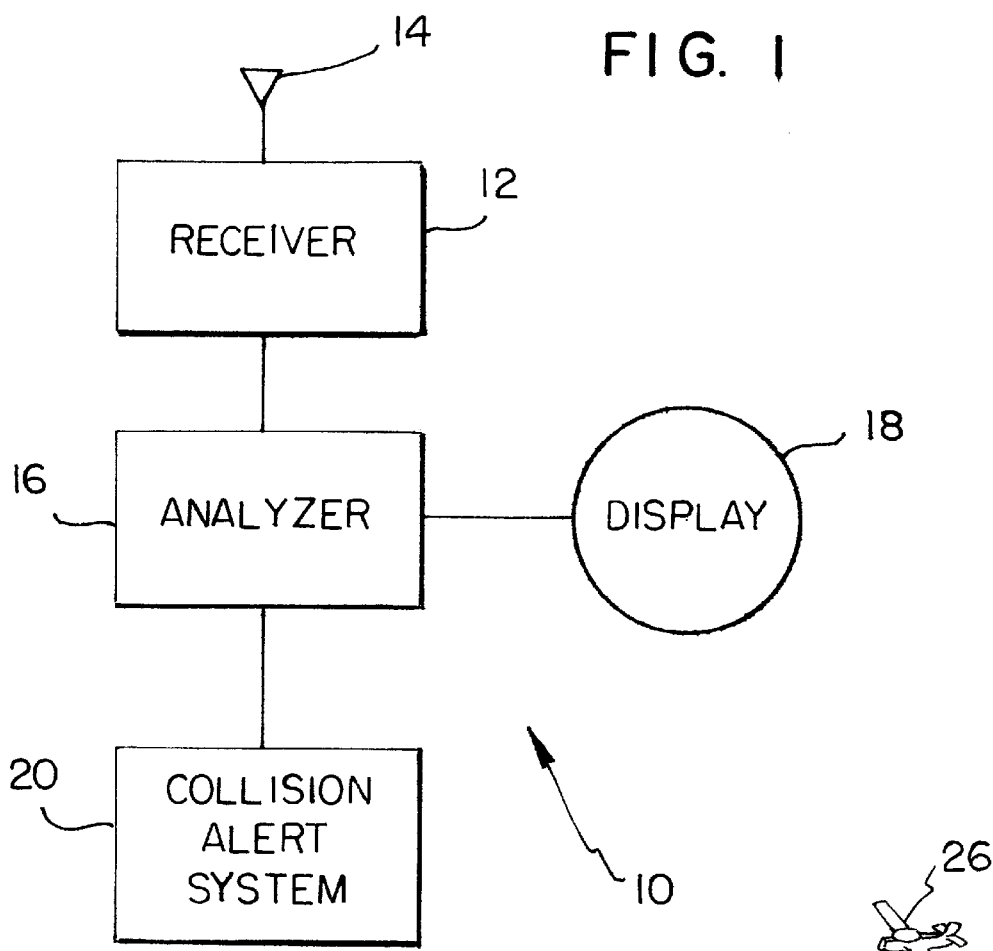
FIG. 1 is a simplified block diagram of a collision-avoidance system according to an embodiment of the invention.

Referring now to FIG. 1, a collision-avoidance system, shown generally at 10, includes a receiver 12 receiving beacon signals from an antenna array 14. The outputs of receiver 12 are fed to an analyzer 16. As in my prior patent, analyzer 16 determines a bearing of a target with respect to a centerline of the aircraft. Optionally, analyzer 16 may determine an elevation angle at which the target is located. For collision avoidance purposes, it may be satisfactory if the elevation angle is determine to be within, or outside of, an altitude band of plus or minus 6 degrees above or below the pilot's aircraft (1,000 feet at two miles). As in my prior patent or patent application, analyzer 16 determines from signal strength, or other characteristics, whether the target aircraft is close enough to be of interest.

The output of analyzer 16 is applied to a display 18 for a visual indication of the location of a target in the altitude band of interest. In addition, an indication of distance may also be displayed. Distance may be derived from received signal strength, or other criteria. Display 18 may be of any convenient type including, for example, a cathode-ray tube, light emitting diode, vacuum fluorescent or liquid crystal.

The output of analyzer 16 is also applied to a collision alert system 20. As in my prior patent and application, the output of analyzer 16 may be one or more discrete signals indicative of the azimuth angle with, optionally, an elevation angle (up/level/down). The angles are with respect to a deck of the pilot's aircraft. That is, azimuth is measured clockwise about the aircraft, with zero degrees straight ahead. Elevation angle is measured from the deck angle of the aircraft. That is, if the aircraft is in a climb or a bank, the elevation angle is measured from the non-level deck angle, rather than from a horizontal plane.

Instead of discrete signals, analyzer 16 may produce a digital or analog signal giving the direction of the target in a continuous manner. For purposes of the present description, it is considered sufficient to show and describe a system that relies on eight discrete outputs from analyzer 16. These outputs indicate that a target in the altitude band of interest is located at the following angles clockwise about the aircraft nose:

| Angle off Nose (Deg.) |
| --- |
| 0 |
| 45 |
| 90 |
| 135 |
| 180 |
| 225 |
| 270 |
| 315 |

It is a common experience that one can pinpoint the direction from which a sound reaches the hearer with reasonable accuracy. For example, when one hears a gunshot in the woods, one has no difficulty determining the direction from which the sound came. A gunshot, being an impulsive type sound, is rich in both high and low frequencies. The clues one uses to pinpoint the direction are binaural time delay and differential sound quality. The presence of a wide spectrum of sound in a gunshot provides clues for differential sound quality. The source of a purer sound such as, for example, a songbird in the woods, is more difficult since such a purer, high-frequency, sound contains fewer low frequencies for determining differential sound quality.

Although receiver 12 is illustrated and described as a single receiver, one studying my prior patent and application will understand that receiver 12 may include multiple receiver channels capable of simultaneous operation. In the preferred embodiment, receiver 12 includes four separate receiver channels permitting four or more simultaneous collision threats may be monitored at the same time.

Figure 2:
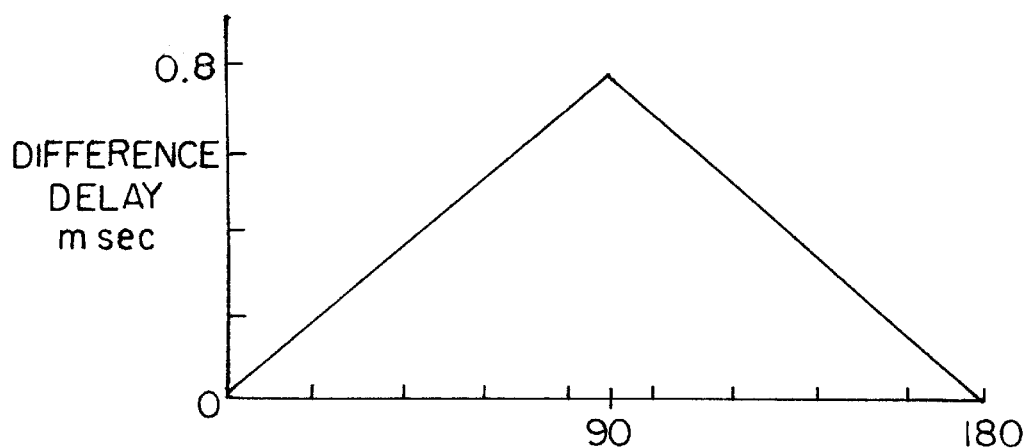
FIG. 2 is a curve relating differential acoustic delay difference to head angle.

Referring to FIG. 2, the ears of an average human being are spaced about 0.8 feet apart. A sound arriving from a source directly in front or directly behind the hearer arrives at the same time. However, sound arriving from a source at 90 degrees from front or rear reaches the nearer ear about 0.8 milliseconds before it reaches the further ear. As illustrated, the difference in time of arrival varies from zero at zero degrees (straight ahead) to about 0.8 milliseconds at 90 degrees (at right angles to the right), and then decreases to zero at 180 degrees (directly behind). That is, the right ear receives the sound about 0.8 milliseconds before the left ear receives the sound. Not illustrated, but the same in magnitude, but opposite in direction, is the delay from sound sources in the angular range from 180 degrees to 360 degrees. In the 180 to 360 degree angular range, the left ear receives the sound before the right ear. Humans are capable of detecting the left-right angle of a sound source by this small difference in the time of sound arrival, and using this difference as part of the information for determining the direction of the source.

Figure 3:
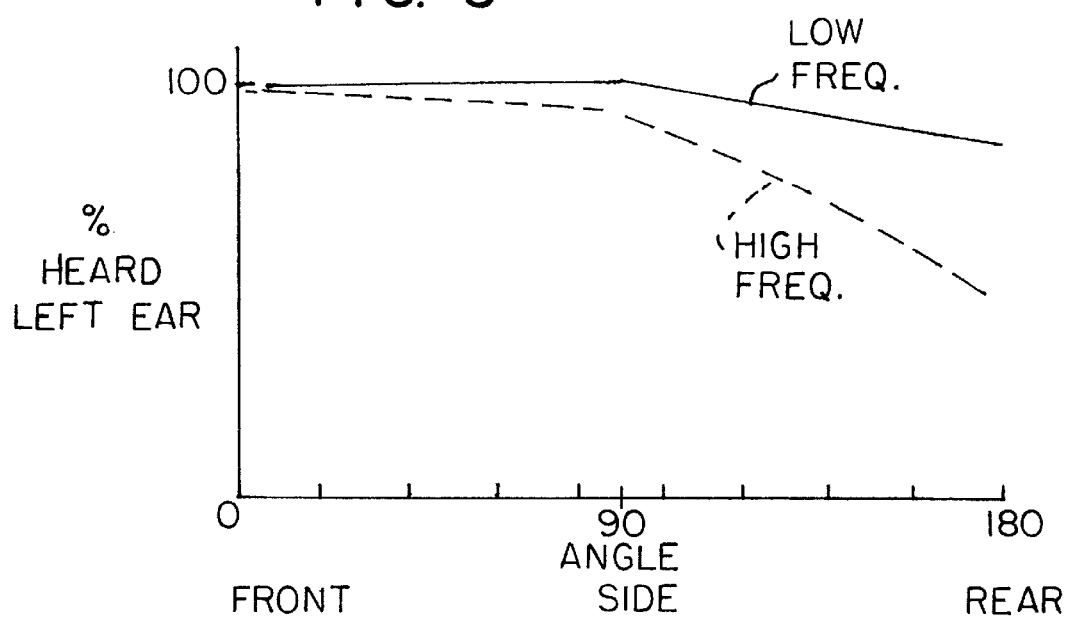
FIG. 3 is a curve comparing the response of human ears to high and low frequencies as a function of head angle from the acoustic source.

Referring to FIG. 3, the propagation of sound varies for high and low frequencies. It is well accepted that high frequencies tend to travel in straight lines, whereas lower frequencies are more capable of bending around corners. The shape of the human head, and particularly the shape and placement of the human ears modify substantially a composite sound. That is, sounds received in the ears from the front of a hearer contain a higher percentage of high frequencies than do the same sound received from the rear of the hearer. It is this modification of sound quality, or frequency response, which the hearer of a shot in the woods uses to discern that the gunshot originated behind, rather than in front. The figure indicates that both the high and the low frequency content of a sound directly in front of the hearer is received by the left ear at its full intensity. As the direction of the sound source varies from zero to 90 degrees, the low frequencies, shown in solid line, are virtually unchanged, but the high frequencies, shown in dashed line, are subject to blocking by the head of the hearer. That is, in this angular range, the high frequencies are less able to bend around the head and ears than are the low frequencies. From 90 to 180 degrees, additional modification of the high frequencies result from the shape of the human ear. In addition to the modification of high frequencies received in the left ear, a slightly different modification occurs in the right ear over the 90 to 180 degree range because of the shape of the right ear. For present purposes, an embodiment of the invention is disclosed in which the frequency modification in the 270 to 90 degree sector is neglected. One skilled in the art will recognize that the frequency modification in this area may also be accommodated without departing from the spirit and scope of the invention.

It is the concept of the present invention that the acoustic phenomena of differential time delay and differential frequency response may be used to direct the attention of a pilot in the correct direction to see an aircraft in a possible collision situation.

Referring now to FIG. 4, a horizontal situation is shown with an aircraft 22, bearing a pilot 24, in a possible collision situation with a target aircraft 26. Assuming that target aircraft 26 is within the range and altitude bands of interest, the detection equipment (not shown) produces a signal indicating the 45-degree octant in which the target is found. The target bearing is indicated by a bearing line 28. For purposes of illustration, it is assumed that the target is located at a bearing angle of 45 degrees. A set of eight acoustic generators 30 are disposed 45 degrees apart in the cabin of aircraft 22 at positions corresponding to the eight angles detectable by collision avoidance system 10. The one of the eight acoustic generators 30, closest to bearing line 28 is energized to direct the attention of pilot 24 in a direction close to the 45-degree bearing line 28.

Acoustic generators 30 may be of any convenient type provided that the sound pattern generated is not of a type that is likely to be confused with other sounds normally generated in aircraft 22. In addition, the sound preferably contains a sufficiently broad acoustic spectrum to enable directional determination from the received differences in high- and low-frequency acoustic components. For example, the sound should not be of a type that can be confused with a stall warning horn, a gear-up horn, or any of the various beeping signals that are generated as part of an instrument landing system. The sound patterns of acoustic generators are preferably discontinuous. That is, the sound patterns are preferably beeping sounds. The duty ratio and period of the sound patterns are variable according to a particular application. In addition, if up/level/down target information is to be conveyed, the sound pattern can be varied in period and/or frequency to indicate this additional information. In one embodiment, a target aircraft 26 at an angle above aircraft 22 may be indicated by a rising frequency (an up-chirp), one at zero elevation angle by a constant frequency, and one below by a descending frequency (a down-chirp). A similar effect can be attained using a constant-frequency signal which is repeated rapidly for up targets, at a medium speed for same-angle targets, and at a slow speed for targets below. A constant-frequency signal which has an increasing pulse repetition frequency (PRF) for higher targets, a constant PRF for same-altitude targets, and a decreasing PRF for lower targets, cans serve the same purpose of adding relative altitude information to the collision alert signal.

The system of FIG. 4, while it is believed to be useful, suffers from some minor drawbacks. The high noise level in the average general aviation aircraft tends to interfere with clear sound reception. In addition, many general aviation pilots wear close-fitting headphones to enable communication with the ground, and to mute cockpit noise. Such headphones may interfere with the delay and sound-quality clues discussed above, and may reduce the effectiveness of the system.

Figure 5:
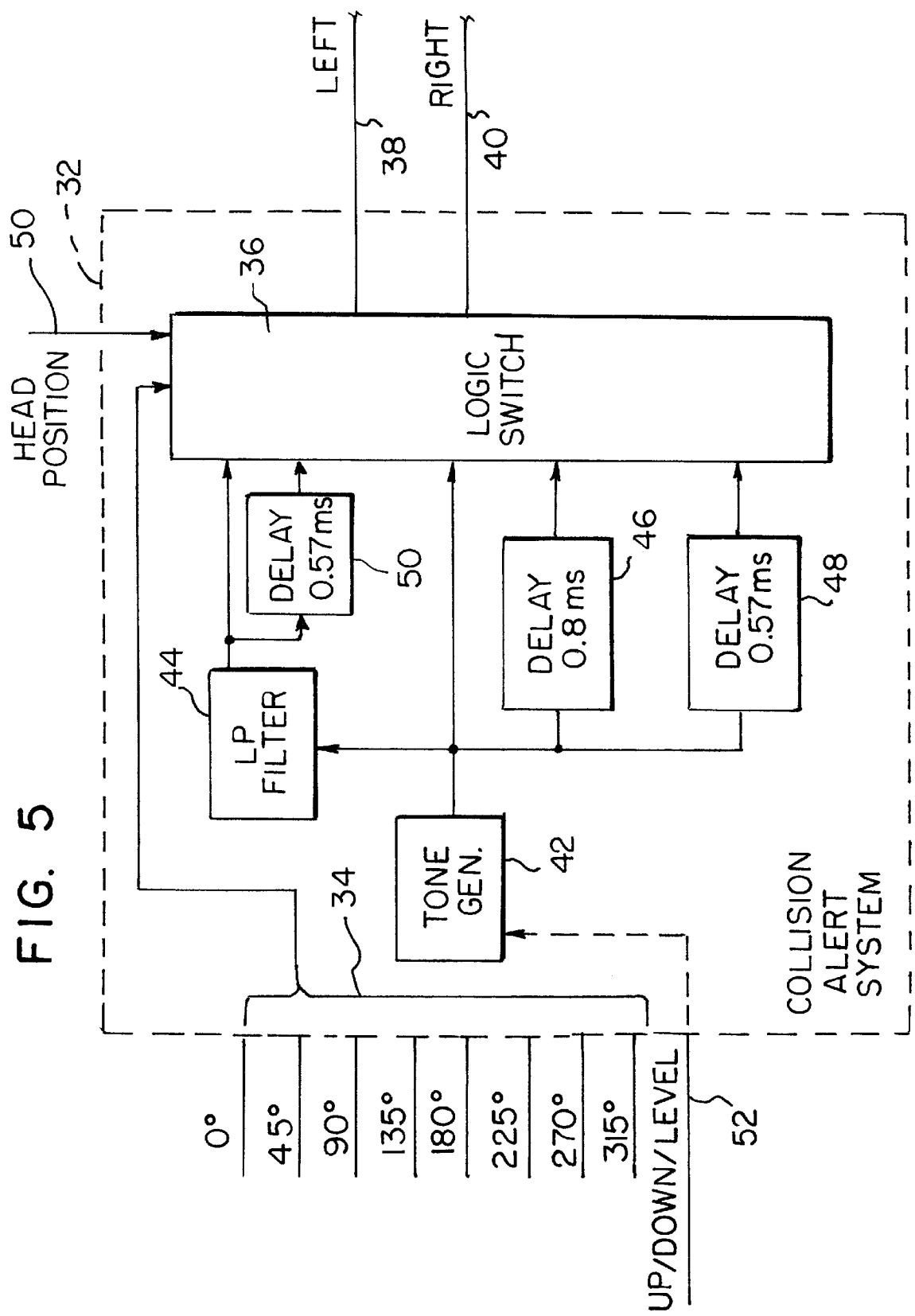
FIG. 5 is a block diagram of one embodiment of a collision alert system director for simulating binaural alerting signal to a headphone-equipped pilot.

Referring now to FIG. 5, a collision alert system 32 is effective for simulating the situation of FIG. 4 for a headphone-wearing pilot. Eight input signals 34 are applied to a logic switch 36. Logic switch 36 applies a left signal to a left signal line 38, and a right signal to a right signal line 40. Left and right signal lines 38 and 40 are applied to left and right headphones, respectively worn by a pilot.

Stereo systems simulate a source angle of an acoustic signal by recording sounds at a pair of spaced-apart microphones, and by playing back the two recorded signals on spaced apart speakers or headphones. The time differences between the two signals can make the sound source appear to be anywhere in the forward 180 degrees (270 clockwise to 90 degrees). That is, even though the sound is reproduced on a pair of spaced-apart speakers or headphones, it's source can appear to be at any location at or between the speakers or headphones, including directly in the center between the speakers or headphones where, in fact, no transducer actually exists.

Two further effects must be accommodated to use a headphone-based collision alert system effective. The first effect is the acoustic spectral difference between a front-originating source and a rear-originating source. A further effect is that head motion of the pilot must be accounted for. That is, as the head of the pilot swivels toward the apparent sound, the time difference and delay must be changed so that, for a simulated sound off the aircraft axis at, for example, 45 degrees, when the pilot's head swivels from front to 45 degrees, the apparent direction of the sound, as perceived by the pilot, moves from 45 degrees, before swivelling the head, to directly in front, upon completion of the head swivelling. The signals on left and right lines 38 and 40, for the pilot's head straight ahead are composed of the delay and filter characteristics in the following table:

|       | HEADPHONE SIGNALS | | | |
|       | LEFT | | RIGHT | |
| ANGLE | DELAY | FILTER | DELAY | FILTER |
| 0     | 0    | N | 0    | N |
| 45    | 0.57 | N | 0    | N |
| 90    | 0.8  | N | 0    | N |
| 135   | 0.57 | Y | 0    | Y |
| 180   | 0    | Y | 0    | Y |
| 225   | 0    | Y | 0.57 | Y |
| 270   | 0    | N | 0.8  | N |
| 315   | 0    | N | 0.57 | N |

A tone generator 42 produces an acoustic signal having suitable characteristics for processing to produce left/right acoustic signals for application to the pilot's left and right headphones. For purposes of illustration, tone generator 42 may produce a constant-frequency pulsed tone having the desired acoustic spectrum (frequency, harmonic content, etc.). The tone is applied directly to an input of logic switch 36, as well as to inputs of a low-pass filter 44, a long delay 46 and a short delay 48. The outputs of long delay 46 and short delay 48 are applied to inputs of logic switch 36. The filter characteristics of low-pass filter 44 degrade the signal, especially the higher frequencies, in a manner similar to the degradation in acoustic spectrum for a sound originating behind the ear (in the 90 to 270 degree sector). The filtered output of low-pass filter 44 is applied directly to an input of logic switch 36 and to an input of a short delay 50. The filtered and delayed output of short delay 49 is applied to an input of logic switch 36.

Short delay 48 simulates a sound originating at 45 or 315 degrees—both forward of the pilot's ears. Long delay simulates a sound originating at 90 or 270 degrees—directly off the right or left ear. Although not strictly correct, it is assumed that no more than small error results from treating the high and low frequencies of acoustic spectrum of sounds received anywhere in the forward 180 degrees (270 to 90 degrees) are unmodified. Thus, for a forward source, either zero delay, a long or a short delay, applied to the signal directed to the ear furthest from the assumed source, while applying the undelayed signal to the remaining ear, is considered to give sufficient left-right clues to the source angle.

For signals originating in the 135 to 225 sector, in which the presumed source is behind both of the pilot's ears the signals fed to both ears is filtered to modify the high frequencies. In this sector, short delays are imposed to the signal going to the ear presumed furthest from the source. In the 180 degree direction, the long delay is imposed with filtering on both of the channels.

The foregoing logic assumes that the target angle is with respect to the aircraft axis. However, this output would not be particularly useful since it is expected that the pilot will swivel the head toward the direction of the target. If the signals to the left and right ears remained as described above, the pilot would be deprived of the best clues as to the target source. That is, when the pilot makes a first estimate of the direction of the target, the head is swivelled toward the apparent direction. The signals fed to the left and right ears must be compensated so that if, for example, the original signal appeared to originate at 45 degrees, when the pilot's head turns to the 45 degree direction, the signal is adjusted to appear to come from directly in front of the pilot's head, namely 45 degrees from the aircraft nose. To accomplish this, a head-rotation position signal is applied to logic switch 36 on a head position line 50.

The head position signal on head position line 50 may be derived in any convenient manner. For example, a commercially available system named ISCAN Headhunter may be used to derive a head position. The ISCAN Headhunter uses a magnetic sensor to track the pilot head position. Other types of head-position sensors, including mechanical, electro-optical or other may be used without departing from the spirit and scope of the invention.

Referring to the table above, if the pilot's head position is rotated to, for example, 45 degrees, all left and right responses move up one row. That is, a target at 45 degrees has an apparent angle of zero degrees, whereas a target at 90 degrees has an apparent angle of 45 degrees, and so forth. This compensation is conveniently performed in logic switch 36. Logic switch 36 may be realized in any convenient hardware including, for example, electro-mechanical switches, digital logic switches but, in the preferred embodiment, logic switch 36 includes a microprocessor having stored therein the switching and translation functions defined above. When logic switch 36 is realized in a microprocessor at least some of the functions of delay and filter, shown and described above as separate elements, may be performed by the microprocessor without the need for auxiliary hardware.

When collision alert system 32 includes information about up/level/down target location, this information is applied on an elevation line 52 to tone generator 42 which is thereupon enabled to produce chirped or varying-period acoustic signals as noted above.

Figure 6:
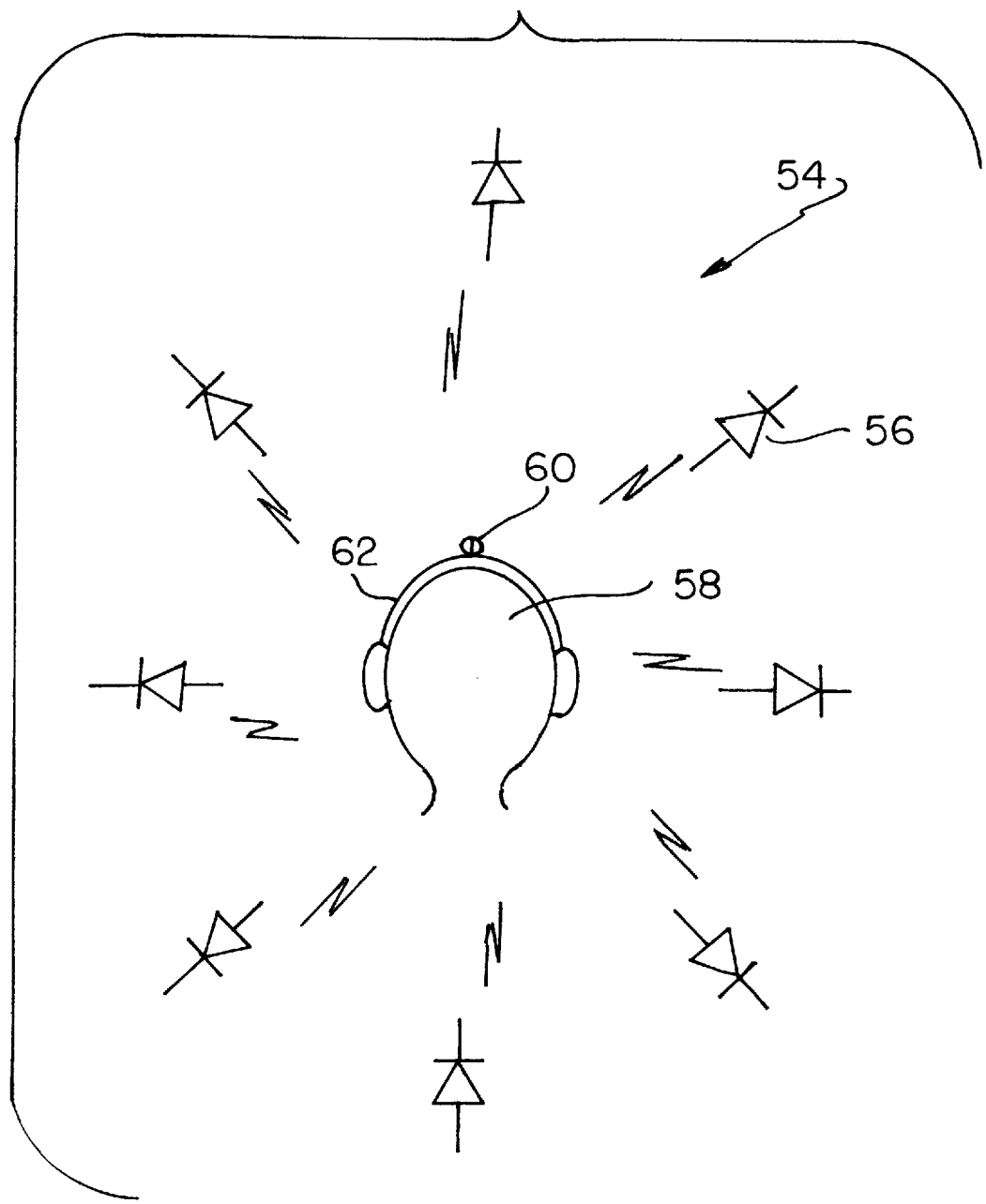
FIG. 6 is a view illustrating an embodiment of the invention employing a plurality of radiation sources arrayed about the pilot, and a directional receiver array fixed to a headphone.

In a further embodiment seen in FIG. 6, a collision alert system, shown generally at 54, includes a plurality or radiation sources 56 spaced 45 degrees apart about a pilot 58 in a manner similar to the spacing of acoustic generators 30 in FIG. 4. A directional receiver array 60 on a headphone 62 receives a radiation signal from a one of the radiation sources energized at any time. In the same manner as described above, a radiation source 56 disposed in the target direction is energized. One element in directional receiver array 60 receives the radiation from the energized radiation source 56. The elements of delay and filtering, such as described in connection with FIG. 5, are imposed on the signal received in directional receiver array 60. However, the collision alert system on-board headphone 62 need apply the delay and filtering only with respect to the element in directional receiver array 60 which receives the signal at any time, since compensation for head swivel is automatically accomplished.

Radiation sources 56 are preferably light emitting diodes and, most preferably, infra-red light emitting diodes. Directional receiver array 60 is preferably an array of elements responsive to the radiation produced by the light emitting diodes.

Figure 7:
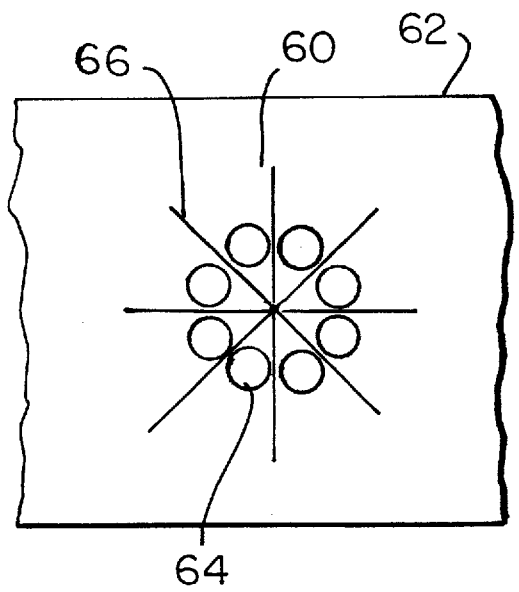
FIG. 7 is a close-up top view of the directional receiver array of FIG. 6.

Referring momentarily to FIG. 7, directional receiver array 60 includes a set of eight light receivers 64 in a circular array atop headphone 62. Each light receiver 64 is optically shielded from its neighbors by shield plates 66 so that only one, or at most two, light receivers 64 receives radiation at any time. One skilled in the art will recognize that shield plates 66 may be replaced with optical lenses having limited fields of view which, together, form the segmented field of view corresponding to that produced by shield plates 66.

The output of radiation sources 56 may be a constant signal indicating the direction of the target, as derived, for example, by my prior patent or application. Alternatively, this output may be modulated with, for example, a constant or pulsed tone corresponding to that produced by tone generator 42 of FIG. 5.

In a further embodiment of the invention, only a single radiation source 56 is employed with an array of light receivers 64. The optical signal from the radiation source 56 is modulated to indicate the target bearing. The collision alert system on headset 62 determines head turn angle from the one of the light receivers which is energized by the single radiation source 56. This gives the collision alert system all of the information employed in the system of FIG. 5. That is, target bearing with respect to the aircraft nose is indicated by the modulation on radiation source, and the angle of the pilot's head with respect to the aircraft nose is indicated by the one of the array of light receivers which is energized at any time. The collision alert system on-board headphone 62 is thus enabled to perform the necessary delays and filtering necessary to indicate to the pilot the direction of the target with respect to the pilot's direction of view.

It is well known in anti-aircraft missile technology that a collision course between two airborne objects is indicated by a constant rate of change of course angle between the two objects. In one example, known as the pure-pursuit course, the course angle between the two objects remains constant, i.e. the rate of change is zero. A pilot in a pure-pursuit collision course observes that the angle at which a second object appears remains constant. If the objects are on parallel courses, the intersection point of the two objects is infinity. Otherwise the intersection point is at some finite point. The pilot observes that the angular location of the object is constant in azimuth and elevation, but the apparent object size is decreasing or increasing. The decreasing-size case is safe since the object is moving away, and is thus not a collision threat. In the increasing-size case, an imminent collision threat may require imminent attention from the pilot.

Figure 8:
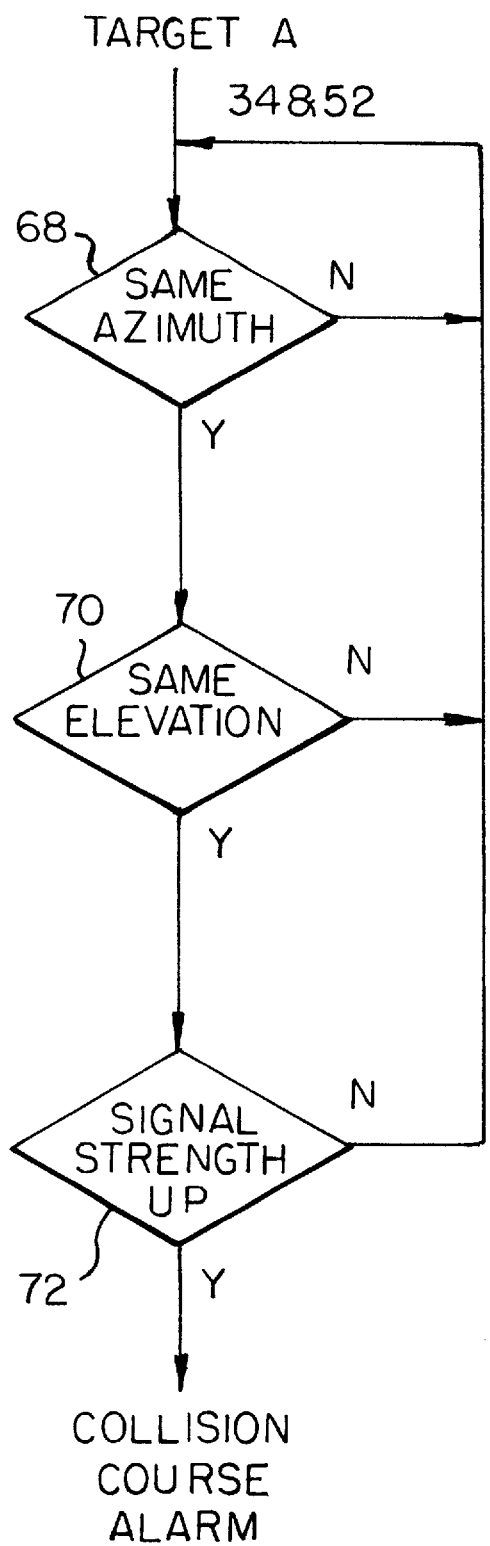
FIG. 8 is a flow diagram of an embodiment of the invention for detecting the existence of a collision course.

Referring now to FIG. 8, a flow diagram illustrates the process for determining the existence of a collision course.

As noted above, a collision course exists when the azimuth and elevation angles of a target A remain substantially constant, and the range to target A is decreasing. An increase in signal strength is taken as an indication of a decrease in range. A stage 68 checks whether the detected azimuth angle in the current detection is the same as in previous detections. If it is, then a stage 70 determines whether the elevation angle in the current detection is the same as in previous detections. If it is, a stage 72 determines whether the signal strength in the current detection is greater than in previous detections. If this final stage 72 answers in the affirmative, then the condition of zero angle rate and decreasing range triggers the generation of a collision course alarm. The collision course alarm is applied to collision alert system 20 of FIG. 1 to produce an additional alarm function to ensure the full attention of the pilot in this critical situation.

The functions illustrated in FIG. 8 may be realized using any convenient apparatus but, in the preferred embodiment, these functions, including storage, comparison and signal generation, are preferably performed in a programmed digital computer and, most preferably, in a programmed microprocessor.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for directing a person's viewing attention in the direction of a target comprising:

means for determining a first angle to a target with respect to a reference line;

means for producing a binaural acoustic signal related to said angle;

said acoustic signal including delay and frequency compensation over at least a range of said first angle capable of giving said person audible cues as to a location of said target;

means for compensating said acoustic signal according to a second angle of a head of said person with respect to said reference line so that an apparent angle to said target with respect to said person is straight ahead when said first and second angles are equal;

said means for compensating including a plurality of acoustic generators angularly spaced about said person; and a one of said acoustic generators at an angle closest to said first angle is energized, whereby said person is enabled to employ natural delay and frequency compensation of sound generated by said one acoustic generator to swivel his head thereby to control said second angle substantially equal to said first angle.

2. Apparatus for directing a person's viewing attention in the direction of target comprising:

means for determining a first angle to a target with respect to a reference line;

means for producing a binaural acoustic signal related to said angle;

said acoustic signal including delay and frequency compensation over at least a range of said first angle capable of giving said person audible cues as to a location of said target;

means for compensating said acoustic signal according to a second angle of a head of said person with respect to said reference line so that an apparent angle to said target with respect to said person is straight ahead when said first and second angles are equal;

said means for producing an acoustic signal including:

left and right headphones suitable for wearing by said person;

at least one radiation source stationarily affixed with respect to said first angle;

at least first and second receiving elements being effective for receiving radiation from said radiation source; and each of said at least first and second receiving elements having angularly spaced apart receiving fields of view.

3. Apparatus according to claim 2, wherein said means for compensating including means for determining said second angle in response to which of said at least first and second receiving elements receives said radiation.

4. Apparatus according to claim 3, wherein said at least one radiation source includes a plurality of radiation sources angularly spaced about said person.

5. Apparatus according to claim 3, wherein said at least one radiation source includes a single radiation source.

6. Apparatus according to claim 5, wherein:

radiation from said single radiation source includes modulation; and said modulation including information regarding said first angle.

* * * * *